United States Patent [19]

Radford

[11] 3,946,976

[45] Mar. 30, 1976

[54] MEANS FOR RESILIENTLY SUPPORTING A BODY

[75] Inventor: Michael Harold Radford, Guildford, England

[73] Assignee: Barry Wright Corporation, Watertown, Mass.

[22] Filed: Nov. 18, 1974

[21] Appl. No.: 524,357

[30] Foreign Application Priority Data
June 5, 1973  United Kingdom............... 26876/73

[52] U.S. Cl.................. 248/18; 188/1 B; 248/358 R
[51] Int. Cl.²................. F16F 7/00; F16F 9/346; F16D 63/00; F16F 13/00
[58] Field of Search............ 248/18, 358 AA, 358 R, 248/188.2; 180/41; 280/6 R, 6 H; 188/1 B; 267/160

[56]  References Cited
  UNITED STATES PATENTS

| | | |
|---|---|---|
| 3,184,208 | 5/1965 | Tanaka .............................. 248/429 |
| 3,288,541 | 11/1966 | Tracy................................ 267/160 X |
| 3,328,019 | 6/1967 | Wilson ............................. 280/6 R X |

FOREIGN PATENTS OR APPLICATIONS 1,362,687  4/1964  France .................. 248/358 R

*Primary Examiner*—J. Franklin Foss
*Attorney, Agent, or Firm*—Milton E. Gilbert

[57] ABSTRACT

A system is described for stabilizing a resiliently supported body in order to permit translational motion while preventing angular motion within at least one predetermined plane. The system comprises the body to be supported, at least one sheathed cable, and fixed mounting supports. The end portions of each cable and sheath are connected to the body and to the fixed mounting supports in such a manner that motion of that part of the body connected to one end of a sheath or cable results in a force exerted by the other end of the sheath or cable to move that part of the body connected to the said other end of the sheath or cable so that motion of the body is substantially purely translatory.

16 Claims, 6 Drawing Figures

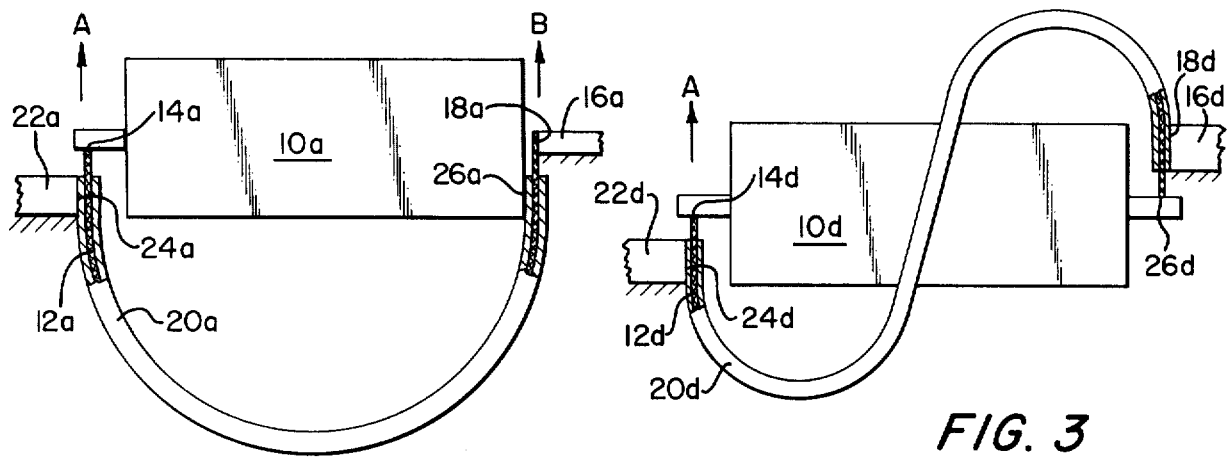
FIG. 1
FIG. 3
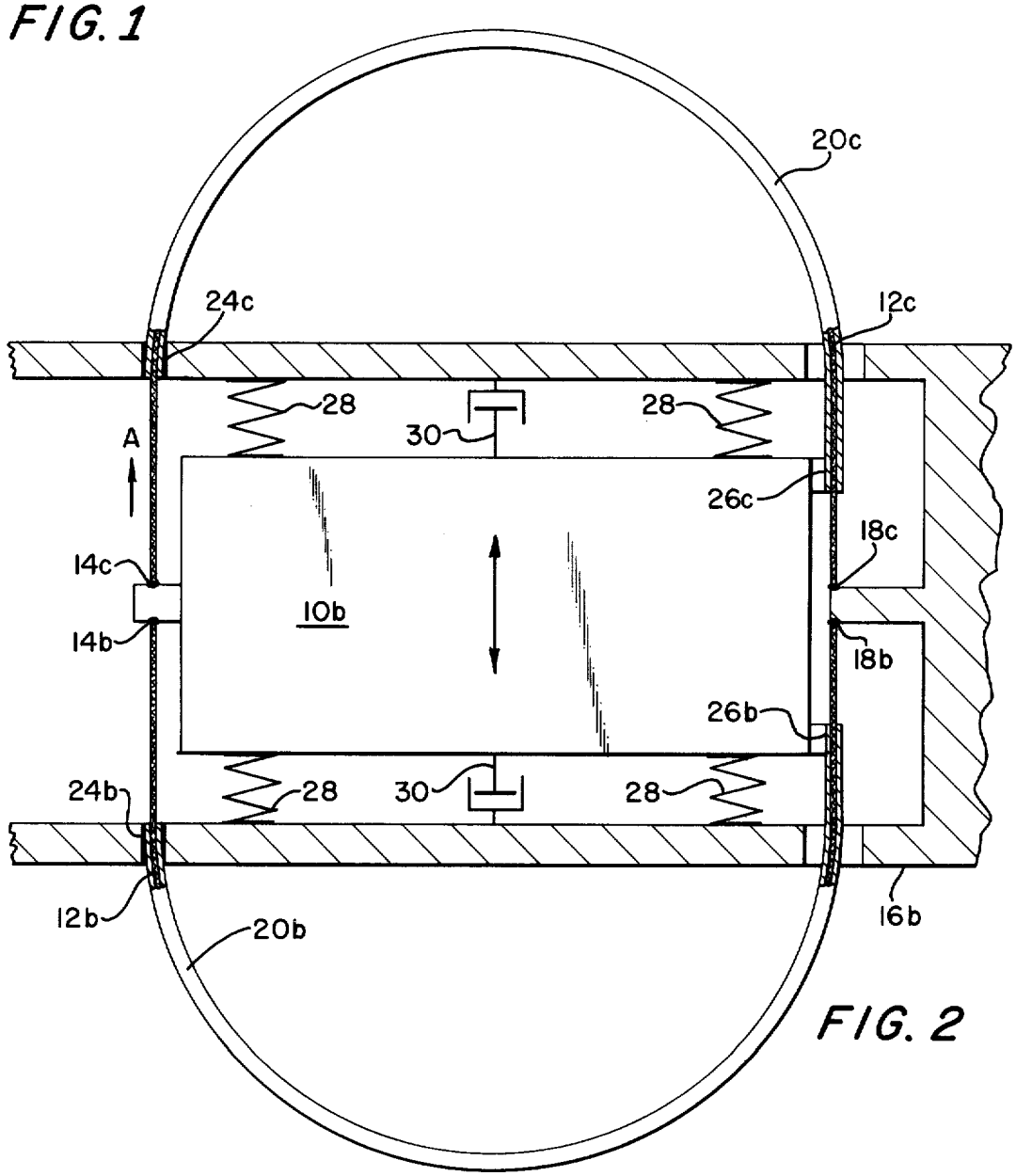
FIG. 2

MEANS FOR RESILIENTLY SUPPORTING A BODY

This invention relates to stabilizing a resiliently supported body in order to prevent the body from undergoing angular motion in at least one plane while permitting translational motion of the body in that plane.

It is generally known that a body can be supported by resilient supports in order to minimize the effects of mechanical vibration and shock. When the body is subjected to vibration or shock disturbances, motion of the body, however, can still occur relative to the fixed structure on which the resilient supports are mounted. This motion can be translatory, i.e., any axis through the body remains parallel to its original position before displacement, or angular, i.e. any axis through the body after displacement is not parallel to its original position before displacement. More likely, the motion is a combination of translational and angular motion. In some circumstances it is desired to resiliently support a body and to permit translational motion of the body in a plane but to prevent angular motion in that plane. For example, where an element of an optical or electronic instrument is resiliently supported and aligned with another element, a small translation movement of one element may not significantly upset the alignment of the two elements. However, an angular movement might seriously effect the accuracy of the instrument.

The primary object of this present invention, therefore is to provide apparatus which overcomes the aforementioned problems.

More specifically, an object of the present invention is to provide an improved apparatus for resiliently supporting a body so that the body can undergo translational movement in a plane yet is prevented from undergoing angular movement in that plane.

Another object of the present invention is to provide a stabilization system for preventing angular motion within at least one predetermined plane which does not involve large and cumbersome structures.

Other objects of the present invention will be apparent to persons skilled in the art from the description presented below.

The foregoing and other objects of the invention are achieved by apparatus which comprises the body to be supported, at least one sheathed cable, and at least one fixed mounting support. Each end portion of both the sheath and cable is connected either to the body or to the fixed mounting support. The fixed support may be part of the structure in or on which the body is supported or it may be separate structure or structures. Normally, the connections on one sheath and cable all lie substantially in a plane which is the plane in which only translational motion is permitted. If it is desired to prevent angular motion in two or three different planes, this can be done by providing sheathed cables in each of such planes.

Each sheathed cable can be connected to first and second spaced-apart connecting points on the body and third and fourth spaced-apart connecting points on the fixed mounting support (the connecting points defining the predetermined plane) in a manner so that:

1. The end portions of the sheathed cable are substantially parallel with each other and extend in the same direction, the cable being rigidly connected to and extending between the first point of the body and the fourth point of the fixed mounting support and the sheath being rigidly connected to and extending between the second point of the body and the third point of the mounting support; or 2. The ends of the sheathed cable are substantially parallel with each other and extend in opposite directions, the cable being rigidly connected to and extending between either one of the two points of the body or the two points of the fixed mounting support and the sheath being rigidly connected to and extending between the other two points of the mounting support or body.

For a fuller understanding of the invention and knowledge of particular features and advantages thereof, reference should be made to the following complete description of several embodiments of the invention, taken in conjunction with the appended claims and accompanying drawings wherein:

FIG. 1 is a partially schematic, partially cross-sectional, elevational side view of the interconnections of the body, the sheathed cable and the fixed mounting of one embodiment of the present invention;

FIG. 2 shows a partially schematic, partially cross-sectional, elevational side view of a body which is resiliently supported and is stabilized in one plane in accordance with the teachings of the FIG. 1 embodiment;

FIG. 3 shows a partially schematic, partially cross-sectional, side elevational view of the interconnection of the body, the sheathed cable and the fixed support of another embodiment of the present invention;

Figure 5:
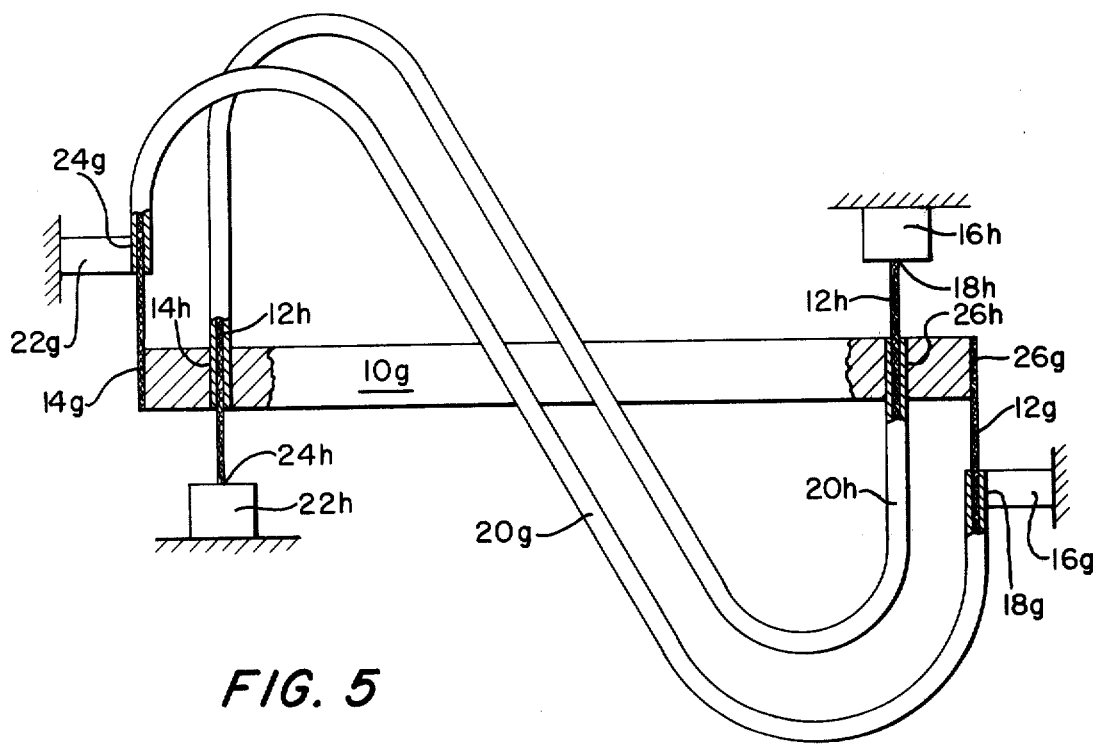
Figure 6:
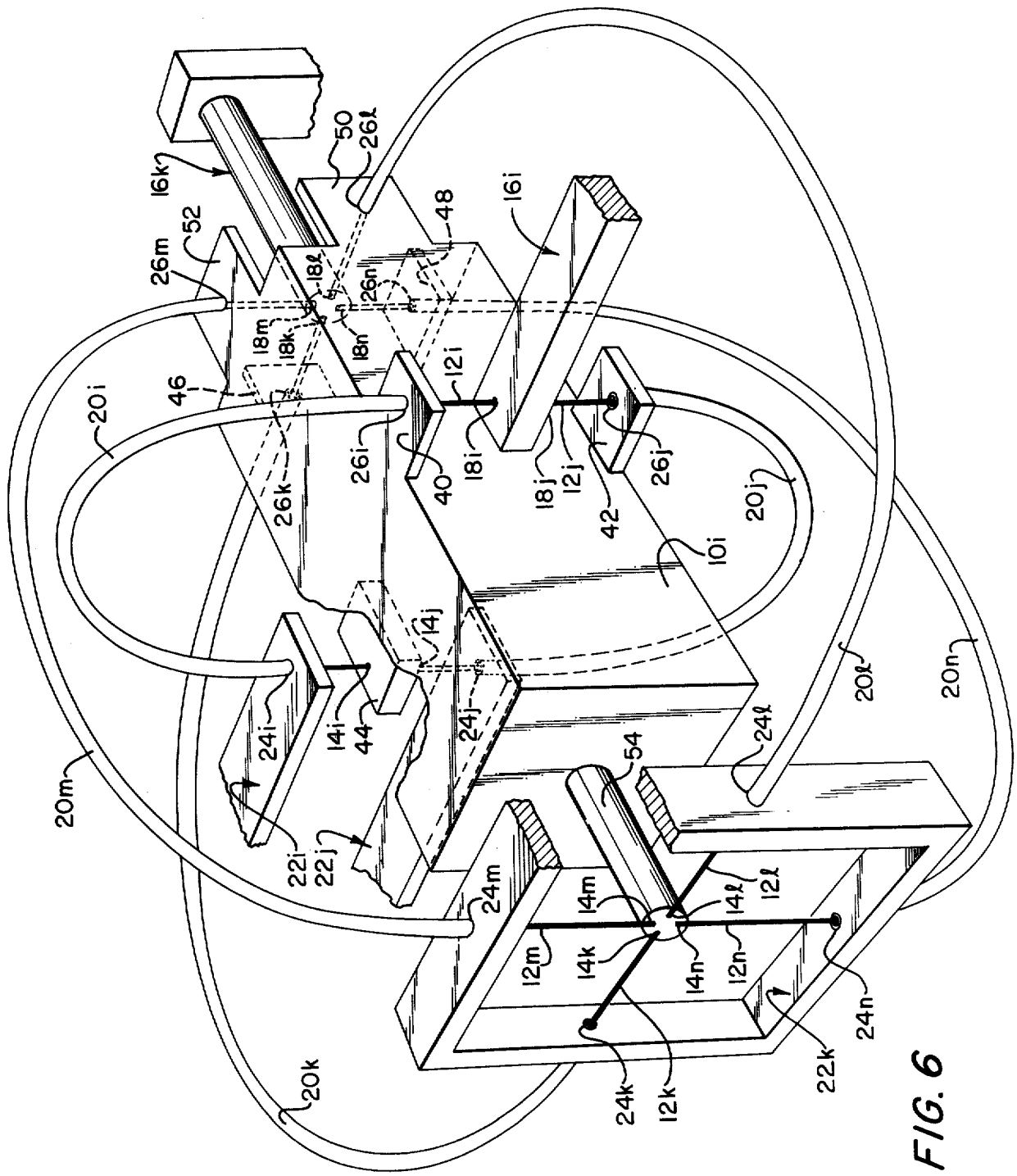

FIG. 5 shows a partially schematic, partially cross-sectional, side elevational view of the interconnection of the body, two sheathed cables and the fixed mountings of a further embodiment of the present invention; and FIG. 6 shows a somewhat schematic perspective view of the interconnection of the body, sheathed cables and fixed supports of a body which is stabilized against angular motion in three planes in accordance with the teachings of the embodiment shown in FIGS. 1 and 2.

In the drawings, like numerals refer to like parts.

In FIG. 1 there is shown a body 10a to be supported by resilient supports (not shown). The body 10a may be an apparatus or system or an element or elements thereof. The body can be, for example, an element of an optical element or electronic instrument which must be maintained in alignment with another element or instrument regardless of its translational position. One end of a wire cable 12a is rigidly connected to the body at a connecting point 14a and the other end of the cable is rigidly connected to a fixed mounting support 16a at point 18a. The wire cable 12a is disposed within and slidable relative to a flexible sheath 20a which is rigidly connected at one end to a fixed mounting 22a at point 24a. The other end of the sheath is rigidly connected to the opposite end of the body at point 26a. The cable and sheath may be attached to the body and fixed mounting support in any well known manner such as welding, clamping or the like. The connecting points 14a, 18a, 24a and 26a all lie substantially in the same plane. The cable 12a and sheath 20a are preferably made of steel, although other material can be used. The cable and sheath are preferably flexible so that they can be lead in and around gaps or openings in the apparatus or system of which body 10a is part, so that the stabilization system for the body does not involve a large and cumbersome structure. Both cable 12a and sheath 20a have a high axial stiffness and low transverse stiffness. The low transverse stiffness means that the sheath and cable can readily assume the U-shaped configuration shown in FIG. 1, so that the end portions of the sheath and cable where they are attached, are substantially parallel. If one end of the body is displaced by an upward vertically directed force exerted, for example, adjacent to the connecting point 14a, the cable 12a will experience a pull, and the end of the cable which is connected to the body at point 14a, will move in the direction of the arrow A. Since the opposite end of the cable 12a is rigidly connected to fixed mounting 16a at point 18a, this movement will exert a force on sheath 20a whose opposite end at point 26a is free to move correspondingly in response to this force, in the upward vertical direction of arrow B. Since the body 10a is rigidly connected to the end of sheath 20a at point 26a, this end of body 10a is moved in an upward direction an equal amount. Thus, the body experiences only translational motion in the plane defined by points 14a, 18a, 24a and 26a. In further explanation of the operation of this apparatus it should be noted that where elastic deflection of cable and sheath are ignored, the difference in length between the sheath and the cable will always remain constant irrespective of the relative position of the cable and sheath. For example, a decrease in the distance between one end of the cable and the corresponding end of the sheath will necessarily require an exactly corresponding increase in the corresponding dimension at the other end.

If the end of the body 10a at point 14a is displaced by a downward vertically-directed force, the cable 12a will move downward in the opposite direction to arrow A. If the cable and sheath are sufficiently stiff to transmit compressive forces without buckling to the end of the body at point 26a, the latter end will also move downwardly in a vertical direction by the same amount as the end of the body at point 14a. Although one may use a sheath and cable which are sufficiently stiff to transmit compressive forces satisfactorily, it is preferred to use two flexible sheathed cables which can be lead in and around small gaps in the apparatus or system of which body 10a is a part. This avoids a large and cumbersome structure. If two sheathed cables are used, they are preferably arranged so that they act in opposite directions to each other, as illustrated in FIG. 2 and described below.

FIG. 2 shows a body 10b, which is typically supported by four resilient supports 28. Dampers 30 of known types may also be provided to limit the amount of movement of the mounted body. Each of the two cables 12b and 12c and the respective sheaths 20b and 20c are attached to the body 10b and the fixed mounting support in a similar manner as cable 12a and sheath 20a of the FIG. 1 embodiment. More specifically, one end of the cable 12b is attached to the body 10b at point 14b while the other end is attached to a fixed mounting 16b at point 18b. One end of the sheath 20b is connected to fixed mounting 16b at point 24b and the other end to point 26b of the body. In a similar manner, the cable 12c is attached at one end to the body at point 14c and at its other end to point 18c of the support 16b. The sheath 20c has one end attached to the body 10b at point 26c and its other end to support 16b at point 24c. All of the connecting points of each sheathed cable with the body and fixed mounting support lie substantially in the same plane. Preferably, the two planes defined by the connecting points of the two sheathed cable are coplanar, i.e. all the connecting points lie substantially in the same plane. However, where body 10b is rigid so that its shape will not distort as a result of normal operating stresses, the connecting points of the two sheathed cable may be disposed in different but parallel planes. Cable 12c and sheath 20c are in an inverted U-shaped configuration opposite cable 12b and sheath 20b.

In operation, if the end of the body 10b at points 14b and 14c, is moved in an upward vertical direction generally in the direction of arrow A, cable 12b and sheath 20b will act on the body in the same manner as described with reference to the FIG. 1 embodiment and thus ensure that the body undergoes a translational vertically-directed motion. The cable 12c and sheath 20c operate in an identical manner to the cable 12b and sheath 20b to ensure that the mounted body undergoes only translational motion within the plane defined by the connecting points. Thus, with the cables 12b and 12c and the sheaths 20b and 20c connected as described, the body 10b can be prevented from angular motion in the planes defined by the points 14b, 18b, 24b, 26b, 14c, 18c, 24c and 26c.

An alternative embodiment arrangement for ensuring that the body 10 moves in only translatory fashion within the plane defined by the connecting points 12, 18, 24 and 26 is illustrated in FIG. 3. In this embodiment the ends of a cable 12d are attached to the body 10d at points 14d and 26d and the ends of sheath 20d are attached to fixed mounting supports 16d and 22d at the respective points 18d and 24d, so that the two end portions of the sheathed cable are parallel to and extend in opposite directions with respect to one another. The sheathed cable thus assumes a generally S-shaped configuration between its fixed end portions. Where the body 10d has a straight or concave edge, the connecting points 14d and 26d may be disposed along such edge, in which case the entire sheathed cable would be disposed adjacent such edge within the plane defined by the connecting points. However, substantially the same results are achieved where the plane, defined by the connecting points, passes through the body, e.g. where the connecting points 14d, 18d, 24d and 26d are disposed on opposite sides of the body. In the latter situation, the portion of the sheathed cable between the connecting points extends out of the plane, i.e. the S-shaped portion of the sheathed cable extends in two dimensions, notably, laterally of the body between the aforesaid connecting points and transversely of the plane in which such connecting points lie. In operation, if the point 14d of the body 10d is displaced in an upward vertical direction as shown by arrow A, the end of the cable 12d connected to the body 10d at point 14d will move with it by an equal amount. Since the sheath 20d is fixed to the mountings 16d and 22d, the cable 12d will axially slide in the sheath, causing the end of the cable connected to the body 10d at point 26d to move in an upward vertical direction a distance which is equal to the distance displaced by the point 14d of the body 10d. Thus, the movement of the body in a direction parallel to the plane defined by the points 14d, 18d, 24d and 26d, will be purely translational without angular movement. Similarly, if the body is displaced by a downward vertically-directed force at point 14d in an opposite direction to arrow A, assuming the sheath and cable are sufficiently stiff to transmit compressive forces without buckling, the cable will axially slide within the sheath and the body at point 26d and will be displaced the same distance as that displaced by point 14d. Consequently, the downward movement of the body 10d will translate in a direction substantially parallel to the plane defined by the points 14d, 18d, 24d and 26d.

It will be appreciated that although the ends of the cable 12d and sheath 20d are described and illustrated in FIG. 3 as being respectively attached to the body and fixed mounting support, the attachments can be reversed and the same results achieved. Thus, the cable 12d can be attached at one end to the connecting point 18d of the support 16d and at its other end to the connecting point 24d of support 22d, while the sheath 20d can be attached at one end to the point 14d and at its other end to the point 26d of the body.

Figure 4:
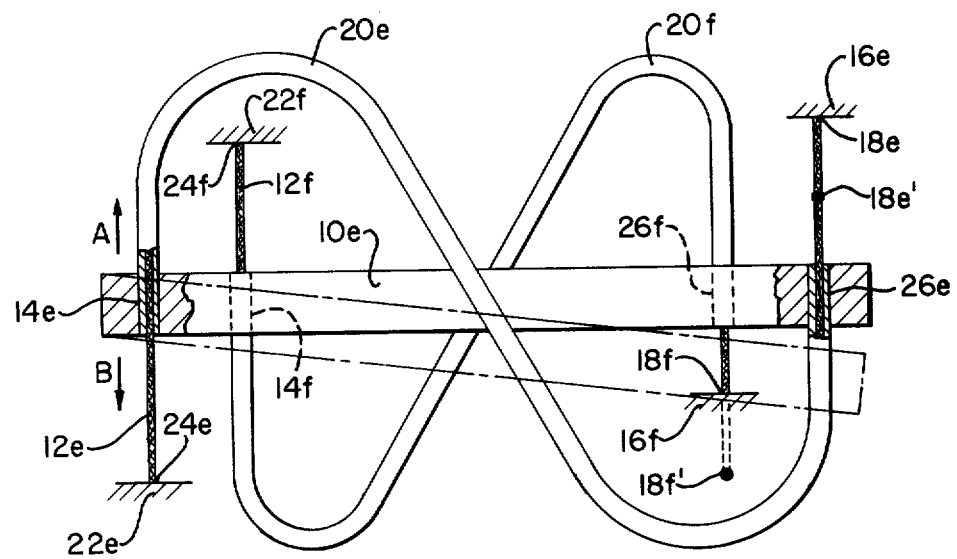
FIG. 4 shows a partially schematic, partially cross-sectional, side elevational view of the interconnection of the body, two sheathed cables and the fixed mounting of still another embodiment of the present invention.

If a single sheathed cable is not sufficiently stiff to satisfactorily transmit compressive forces without buckling, two sheathed cables, which may be rigid or flexible, can each be attached in the S-shaped configuration shown in FIG. 3, as illustrated in FIGS. 4 and 5.

In FIG. 4, the body 10e is supported by a first cable 12e which axially slides in a sheath 20e and a second cable 12f which axially slides in a sheath 20f. The first cable 12e is attached at one end to the fixed support 16e at point 18e and at its other end to the fixed support 22e at point 24e. One end of the sheath 20e is attached to the body 10e at point 14e and the other end to the body at point 26e. The cable 12e and corresponding sheath 20e are attached in the manner prescribed with respect to the arrangement shown in FIG. 3. Thus, the two ends of each attached sheathed cable are disposed so that they are parallel to and extend in opposite directions with respect to one another. Connecting points 14e, 18e, 24e and 26e will therefore all substantially lie in the same plane. The first sheathed cable thus assumes a generally S-shaped configuration as described in connection with FIG. 3. The second cable 12f is attached at one of its ends to the fixed support 16f at points 18f and at its other end to support 22f at points 24f. The two ends of the sheath 20f are attached to the body 10e at the corresponding points 14f and 26f. The second cable and sheath also assumes an S-shaped configuration as described in connection with FIG. 3. The connecting points 14f, 18f, 24f and 26f will all lie substantially in the same plane which may be substantially parallel to the plane defined by the points 14e, 18e, 24e and 26e. Preferably however, the connecting points of the two sheathed cables all lie in the same plane, with the S-shaped portion of one sheathed cable extending over the forward edge of the body and the corresponding portion of the other sheathed cable extending over the rear edge of the same body as shown in FIG. 4.

In operation, if the body 10e at point 14e is displaced a predetermined distance in an upward vertical direction as shown by arrow A, the sheath 20e at point 14e, as well as the sheath 20f at point 14f will move in an upward direction with it. As the ends of the two sheaths move they will axially slide with respect to the corresponding cables 12e and 12f since the latter are attached to the fixed supports. Since the sheaths move at one end with respect to the fixed cables, the sheaths will move an equal distance in an upward vertical direction with respect cables at the other ends at points 26e and 26f. Thus, the body 10e will be translated in an upward vertical direction parallel to the plane or planes defined by the points 14e, 18e, 24e and 26e and 14f, 18f, 24f and 26f. Similarly, if the body is displaced a predetermined distance in a downward vertical direction as shown by arrow B, the sheaths 20e and 20f at points 14e and 14f will move with it. Since the sheaths will move with respect to their corresponding cables, the sheaths will move downward an equal amount at points 26e and 26f. It should be appreciated that where it is desired to adjust the angular position of the body 10e in the plane or planes defined by the connecting points of the cables and sheaths, such as shown in dotted lines in FIG. 4, the appropriate connecting points such as points 18e and 18f are moved to points 18e' and 18f' so as to maintain the ends of each sheath in parallel relation and so that the proper tension in the sheaths and cables are maintained. Movement of the fixed points can be accomplished by any suitable means (not shown), such as for example by screw fittings, eccentric discs, eccentric wheels or the like. It should be also appreciated that although both sheaths are shown attached to the body 10e and the corresponding cables attached to the fixed supports, the arrangement of either or both sheathed cables can be reversed wherein the ends of one or both cables would be attached to the body and the ends of the corresponding sheath or sheaths attached to the fixed supports.

For example, as shown in FIG. 5, one of the cables 12g is shown attached at both ends to the points 14g and 26g of body 10g and axially slidable in the sheath 20g. The latter is attached at one end to the support 16g at point 18g and at the other end to the support 22g at point 24g. The other cable 12h and sheath 20h are attached in a similar manner as cable 12e and sheath 20e shown in FIG. 4. Thus, the cable 12h is attached at one end to the support 22h at point 24h and at its other end to the support 16h at point 18h, while the sheath 20h is attached to the body at one of its ends at point 14h and at its other end at point 26h. This arrangement achieves the same result as that described in FIG. 4, wherein the body 10g can be translated in but prevented from moving angularly within the plane or planes defined by the points 14g, 18g, 24g, 26g and 14h, 18h, 24h and 26h.

The arrangements described herein can be used to permit only translating motion within the plane or parallel planes defined by the connecting points of the sheathed cable. It will be appreciated that where it is desirable to support the body 10 so as to permit only translational motion within two or more planes, any one or combinations of the foregoing arrangements can be employed to define each plane in which angular motion is to be prevented.

For example, FIG. 6 shows the body 10i in which angular movement is prevented in three planes. The body 10i which is shown by way of example in rectangular block form is provided with suitable means for attaching the cables and sheaths. For example, one side of the body 10i can be provided with flanges 40 and 42 and the opposite side with a single flange 44. Additionally, one end of the body is provided with four flanges 46, 48, 50 and 52, while the opposite end is provided with an extending rod 54. The body 10i is positioned between and stabilized with respect to the fixed mounting supports 16i, 16k, 22i, 22j and 22k. Three pairs of sheathed cables are employed wherein each cable is axially slidable within a corresponding sheath. Each pair of sheathed cables are connected to the body and supports in accordance with the arrangements previously shown and described in FIG. 2, wherein the ends of each sheathed cable are connected so that they extend in the same direction, substantially parallel to one another. Further, the connecting ends of one of the sheathed cables of each pair extend generally in an opposite direction to the ends of the other sheathed cable of the pair. Thus, the first pair of cables 12$i$ and 12$j$ are each connected at one end to the support 16$i$ at the respective points 18$i$ and 18$j$ and at their other end to the flange 44 of the body at the respective points 14$i$ and 14$j$. The corresponding sheaths 20$i$ and 20$j$ are each connected at one end to the supports 22$i$ and 22$j$ at the respective points 24$i$ and 24$j$ and at their other end to the flanges 40 and 42 of body 10$i$ at the corresponding points 26$i$ and 26$j$. Similarly, a second pair of cables 12$k$ and 12$l$ are each connected at one end to the support 16$k$ at the respective points 18$k$ and 18$l$ at the other ends to the extending rod 54 at the respective points 14$k$ and 14$l$. The corresponding sheaths 20$k$ and 20$l$ are each connected at one end to the support 22$k$ at the respective points 24$k$ and 24$l$ and at their other ends to the flanges 46 and 50 of body 10$i$ at the corresponding points 26$k$ and 26$l$. Finally, a third pair of cables 12$m$ and 12$n$ are each connected at one end to the support 16$k$ at the respective points 18$m$ and 18$n$ and at their other ends to the points 14$m$ and 14$n$. The corresponding sheaths 20$m$ and 20$n$ are each connected at one end to the support 22$k$ at the respective points 24$m$ and 24$n$ and at their other ends to the flanges 52 and 48 of body 10$i$ at the corresponding points 26$m$ and 26$n$. It will be apparent that the body 10$i$ can be translated, but is restrained against moving angularly within the three defined planes. The first plane is defined by the connecting points of cables 12$i$ and 12$j$ and sheaths 20$i$ and 20$j$, the second plane is defined by the connecting points of cables 12$k$ and 12$j$ and sheaths 20$k$ and 20$j$ and the third plane is defined by the connecting points of cables 12$m$ and 12$n$ and sheaths 20$m$ and 20$n$. If these cables are connected so that the three planes are mutually perpendicular to each other it will be evident that the body 10$i$ can be stabilized to prevent it from rolling, pitching and yawing with respect to the fixed supports.

Since certain changes may be made in the above apparatus without departing from the scope of the invention herein involved, or shown in the accompanying drawing shall be interpreted in an illustrative and not in a limiting sense.

What is claimed is:

1. A stabilizing system comprising:
   a body;
   a fixed mounting support;
   a sheath having first and second connecting portions; and
   a cable slidably disposed within said sheath and having first and second connecting portions corresponding in relative position to the first and second connecting portions of said sheath;
   the first connecting portion of said sheath and the second connecting portion of said cable being connected to said body at first and second spaced apart points respectively and the second connecting portion of said sheath and the first connecting portions of said cable being connected to said support at third and fourth spaced apart points respectively so that said connecting portions of said sheath and cable are substantially parallel and lie substantially within a predetermined plane and displacement of said body at one of said first or second points within said plane will result in a corresponding displacement of said body at the other of said first and second points.

2. A system in accordance with claim 1 wherein said connecting portions of said cable and sheath extend in substantially the same direction.

3. A system in accordance with claim 2 wherein the connecting portions of said cable are at the ends of said cable.

4. A system in accordance with claim 1, further including a second sheath having first and second connecting portions, and a second cable having first and second connecting portions corresponding in relative position to the first and second connecting portions of said second sheath and being slidable within said second sheath, said second sheath and said second cable being attached at one of their said connecting portions to said body at fifth and sixth spaced apart points respectively and being attached at the other of their said connecting portions to said support at seventh and eighth spaced apart points respectively so that the connecting portions of said second cable and second sheath are substantially parallel and lie substantially within a common predetermined plane.

5. A system in accordance with claim 4, wherein the connecting portions of said second cable and second sheath lie in a plane which is substantially parallel to the plane of the connecting portions of said first-mentioned cable and said first-mentioned sheath.

6. A system in accordance with claim 4 wherein said connecting portions of said first cable and sheath extend substantially in a first direction and the connecting portions of said second cable and sheath extend in a second opposite direction.

7. A system in accordance with claim 4, wherein said first mentioned plane is substantially coplanar to said second mentioned plane.

8. A system in accordance with claim 4, wherein said first mentioned plane is substantially perpendicular to said second mentioned plane.

9. A system in accordance with claim 8, further including a third sheath having first and second connecting portions, and a third cable having first and second connecting portions corresponding in relative position to the first and second connecting portions of said third sheath and being slidable within said third sheath, said third sheath and said third cable being attached at one of their said connecting portions to said body at ninth and tenth spaced apart points respectively and being attached at the other of their connecting portions to said support at eleventh and twelfth spaced apart points respectively, so that the connecting portions of said third cable and said third sheath are substantially parallel and lie substantially within a third predetermined plane, said third predetermined plane being substantially perpendicular to said first and second mentioned planes.

10. A system in accordance with claim 4, wherein the second and first connecting portions of said second cable and said second sheath are attached respectively to the fifth point of said body and said seventh point of said support, and the first and second connecting portions of said second cable and said second sheath are attached respectively to said sixth point of said body and said eighth point of said support.

11. A system in accordance with claim 1, wherein one connecting portion of said cable and the corresponding portion of said sheath extend in an opposite direction to the other connecting portions of said cable and sheath.

12. A method of stabilizing a body to permit translational motion of the body in a predetermined plane while preventing angular motion of the body in that plane, which comprises the steps of:
  positioning said body within a fixed support; and
  attaching one portion of a sheath and a corresponding connecting portion of a cable which is slidable within said sheath to two spaced apart points on said body within said predetermined plane and attaching another portion of said sheath and another corresponding connecting portion of said cable to two spaced apart points on said fixed support within said predetermined plane.

13. A system in accordance with claim 2 wherein the connecting portions of said cable comprise the ends of said cable.

14. A system in accordance with claim 6 wherein the connecting portions of said second cable and second sheath lie in a plane which is parallel to the plane of the connecting portions of said first-mentioned cable and said first-mentioned sheath.

15. A stabilizing system comprising:
  a body;
  a fixed mounting support;
  first and second sheaths each having first and second connecting portions; and
  first and second cables slidably disposed within said first and second sheaths respectively with each of said first and second cables having first and second connecting portions corresponding in relative position to the first and second connecting portions of the sheath within which it is disposed;
  first and second connecting portions of said first cable being connected to said body at first and second spaced apart points respectively and the first and second connecting portions of said first sheath being connected to said support at third and fourth spaced apart points respectively, said first and second connecting portions of said second cable being connected to fourth and fifth spaced apart points respectively on said support and the first and second connecting portions of said second sheath being connected to seventh and eighth spaced apart points on said body, with the connecting portions of said first sheath and first cable being substantially parallel and lying substantially within a predetermined plane, and the connecting portions of said second sheath and said second cable also being substantially parallel and lying substantially within a predetermined plane, whereby displacement of said body at one of said first or seventh points within said plane will result in a corresponding displacement of said body at said second or eighth points respectively.

16. A system in accordance with claim 15 wherein the first connecting portions of said first and second cables and said first and second sheaths extends in a substantially opposite direction to the second connecting portions of said first and second cables and sheaths.

* * * * *

UNITED STATES PATENT AND TRADEMARK OFFICE
CERTIFICATE OF CORRECTION

PATENT NO. : 3,946,976
DATED : March 30, 1976
INVENTOR(S) : Michael H. Radford

It is certified that error appears in the above-identified patent and that said Letters Patent are hereby corrected as shown below:

Column 1, Line 51: Insert between the words "be" and "separate" the article "a"

Column 1, Line 66: Delete the word "of" and substitute therefor the word "on"

Column 4, Line 28: Delete the number "12" at end of line and substitute therefor the number "14"

Signed and Sealed this fifteenth Day of June 1976

[SEAL]

Attest:

RUTH C. MASON
*Attesting Officer*

C. MARSHALL DANN
*Commissioner of Patents and Trademarks*